United States Patent
Choi et al.

(10) Patent No.: US 9,792,230 B2
(45) Date of Patent: Oct. 17, 2017

(54) DATA INPUT CIRCUIT OF SEMICONDUCTOR APPARATUS

(71) Applicant: SK hynix Inc., Icheon-si, Gyeonggi-do (KR)

(72) Inventors: Joon Woo Choi, Icheon-si (KR); Chang Ki Baek, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 75 days.

(21) Appl. No.: 14/513,480

(22) Filed: Oct. 14, 2014

(65) Prior Publication Data
US 2016/0004649 A1     Jan. 7, 2016

(30) Foreign Application Priority Data
Jul. 7, 2014    (KR) ........................ 10-2014-0084576

(51) Int. Cl.
| | |
|---|---|
| G06F 13/00 | (2006.01) |
| G06F 3/00 | (2006.01) |
| G06F 11/00 | (2006.01) |
| G01R 31/28 | (2006.01) |
| H03M 9/00 | (2006.01) |
| G06F 13/10 | (2006.01) |
| G06F 13/42 | (2006.01) |

(52) U.S. Cl.
CPC ........ G06F 13/102 (2013.01); G06F 13/4282 (2013.01)

(58) Field of Classification Search
CPC .... G06F 13/102; G06F 13/385; G06F 3/0658; G06F 13/4282
USPC ....... 710/33, 51; 713/400; 714/30, 718, 729, 714/742; 341/100
See application file for complete search history.

(56) References Cited

U.S. PATENT DOCUMENTS

| | | | | |
|---|---|---|---|---|
| 5,694,612 A * | 12/1997 | Garmire | ............. | G06F 13/4256 709/223 |
| 6,049,901 A * | 4/2000 | Stock | ............... | G01R 31/31919 714/30 |
| 6,173,425 B1 * | 1/2001 | Knaack | ................ | G11C 29/003 714/718 |
| 7,031,377 B2 * | 4/2006 | Chen | .................... | H04B 1/7093 375/143 |
| 7,327,814 B1 * | 2/2008 | Xu | .................... | H04L 25/03878 375/295 |
| 7,592,934 B1 * | 9/2009 | Bourstein | ............. | H03K 5/151 341/100 |
| 7,636,802 B1 * | 12/2009 | Baxter | ............. | H03K 19/17744 710/33 |
| 7,646,320 B1 * | 1/2010 | Reichart | ................. | G11C 7/10 341/100 |
| 7,843,749 B2 * | 11/2010 | Do | ........................ | G11C 8/16 365/201 |

(Continued)

Primary Examiner — Farley Abad
Assistant Examiner — Henry Yu
(74) Attorney, Agent, or Firm — William Park & Associates Ltd.

(57) ABSTRACT

A data input circuit of a semiconductor apparatus may include a plurality of parallelizing units corresponding to a plurality of input/output pads in a one-to-one manner, and a data control block configured to transmit serial test data, which may be input through less than all of the plurality of input/output pads, to the plurality of parallelizing units in response to first and second control signals.

18 Claims, 7 Drawing Sheets

(56) References Cited

U.S. PATENT DOCUMENTS

| | | | |
|---|---|---|---|
| 8,218,537 B1* | 7/2012 | Gui | H04L 12/5696 |
| | | | 370/369 |
| 8,390,035 B2* | 3/2013 | Bemanian | H01L 24/14 |
| | | | 257/209 |
| 9,323,633 B2* | 4/2016 | Brambilla | |
| 2003/0041296 A1* | 2/2003 | Bos | G01R 31/318544 |
| | | | 714/729 |
| 2005/0246603 A1* | 11/2005 | Rottacker | G01R 31/31905 |
| | | | 714/742 |
| 2007/0047536 A1* | 3/2007 | Scherer | H04L 49/358 |
| | | | 370/360 |
| 2007/0145997 A1* | 6/2007 | Whetsel | G01R 31/318544 |
| | | | 324/762.05 |
| 2011/0099407 A1* | 4/2011 | Jonas | H03K 19/17744 |
| | | | 713/400 |
| 2011/0110412 A1* | 5/2011 | Shin | H04L 25/0272 |
| | | | 375/224 |
| 2012/0290889 A1* | 11/2012 | Klein | G06F 11/261 |
| | | | 714/719 |

* cited by examiner

DATA INPUT CIRCUIT OF SEMICONDUCTOR APPARATUS

CROSS-REFERENCES TO RELATED APPLICATION

The present application claims priority under 35 U.S.C. §119(a) to Korean application number 10-2014-0084576, filed on Jul. 7, 2014, in the Korean Intellectual Property Office, which is incorporated herein by reference in its entirety as set forth in full.

BACKGROUND

1. Technical Field

Various embodiments generally relate to a semiconductor apparatus, and more particularly, to a data input circuit of a semiconductor apparatus.

2. Related Art

In a semiconductor apparatus, a test process for verifying the operation effectiveness may be necessary.

A test of a semiconductor apparatus may be performed by receiving a predetermined pattern of test data through input/output pads of the semiconductor apparatus. Additionally, testing of the semiconductor apparatus may include monitoring the output of the semiconductor apparatus based on the test data.

It may be advantageous to reduce the number of circuit configurations of a semiconductor apparatus.

SUMMARY

In an embodiment, a data input circuit of a semiconductor apparatus may include a plurality of parallelizing units corresponding to a plurality of input/output pads in a one-to-one manner. The data input circuit of a semiconductor apparatus may also include a data control block configured to transmit serial test data, which may be input through less than all of the plurality of input/output pads, to the plurality of parallelizing units in response to first and second control signals.

In an embodiment, a data input circuit of a semiconductor apparatus may include a plurality of parallelizing units corresponding to a plurality of input/output pads in a one-to-one manner. The data input circuit of a semiconductor apparatus may also include a data control block configured to convert a pattern of serial test data, which may be input through one of the plurality of input/output pads, in response to first and second control signals, and to transmit the serial test data to the plurality of parallelizing units.

DETAILED DESCRIPTION

Hereinafter, a data input circuit of a semiconductor apparatus according to various embodiments will be described in detail with reference to the accompanying drawings through various examples of embodiments.

Various embodiments may reduce the number of circuit configurations, and signal lines for a test in terms of a layout margin of the semiconductor apparatus. Thus, various embodiments may be directed to a data input circuit of a semiconductor apparatus capable of minimizing circuit configurations and signal lines for a test. These embodiments may be further described herein.

Figure 1:
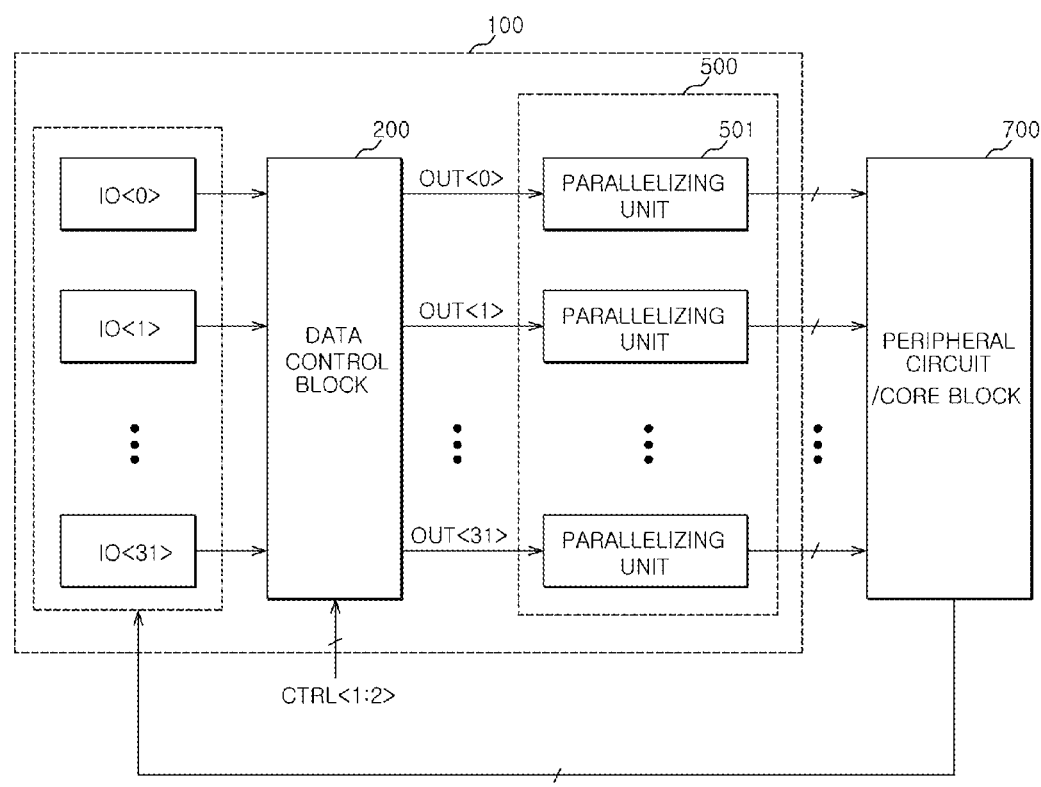
FIG. 1 is a block diagram of a representation of a data input circuit 100 of a semiconductor apparatus according to an embodiment.

Referring to FIG. 1, a data input circuit 100 of a semiconductor apparatus according to an embodiment may include a plurality of input/output pads IO<0> to IO<31>, a data control block 200, and a parallelizing block 500.

In an embodiment, the number of the plurality of input/output pads IO<0> to IO<31> may be 32. However the embodiments are not limited in this way as the number of input/output pads may be more or less than 32. For example, the number of the input/output pads may increase with technology development and the design scheme of future semiconductor apparatuses.

The parallelizing block 500 may include a plurality of parallelizing units 501. The plurality of parallelizing units 501 may correspond to the plurality of input/output pads IO<0> to IO<31> in a one-to-one manner. Each parallelizing unit 501 of parallelizing block 500 may correspond to the plurality of serial test data OUT<0> to OUT<31> in a one-to-one manner for receiving the serial test data OUT<0> to OUT<31> of the data control block 200.

Each of the plurality of parallelizing units 501 may be configured to align input serial data to parallel data, and output the parallel data.

Output from the parallelizing block 500 may be provided to a peripheral circuit/core block 700.

The peripheral circuit/core block 700 may include a memory block and circuit configurations relating to reading and writing data.

The peripheral circuit/core block 700 may be configured to write the output of the parallelizing block 500 in the memory block in response to a write command. The peripheral circuit/core block 700 may be configured to output data written in the memory block to an exterior of the semiconductor apparatus through the plurality of input/output pads IO<0> to IO<31> in response to a read command.

The data control block 200 may be configured to transmit serial test data (i.e., OUT<0> to OUT<31>). The serial test data may be input through a part of the plurality of input/output pads IO<0> to IO<31>, to the parallelizing units 501 corresponding to all the plurality of input/output pads IO<0> to IO<31> in response to control signals CTRL<1:2>.

The data control block 200 may be configured to transmit serial normal data, which is input through the plurality of input/output pads IO<0> to IO<31>, to the parallelizing units 501 corresponding to the plurality of input/output pads IO<0> to IO<31> in response to the control signals CTRL<1:2>.

The control signals CTRL<1:2> may be provided from a device exterior to the semiconductor apparatus, or may be stored through a fuse set and the like so as to output a value set in a test mode according to a MRS (Mode Register Set).

When test data is input through all the plurality of input/output pads IO<0> to IO<31> and thus a read operation is performed, it may be possible to improve the accuracy of a test operation.

In an embodiment, even though test data is input using only a part of the plurality of input/output pads IO<0> to IO<31>, the same operation is performed similarly to the case in which the test data is input through all the plurality of input/output pads IO<0> to IO<31>. In this way, it may be possible to simultaneously improve both the accuracy of the test operation and the testing efficiency.

Figure 2:
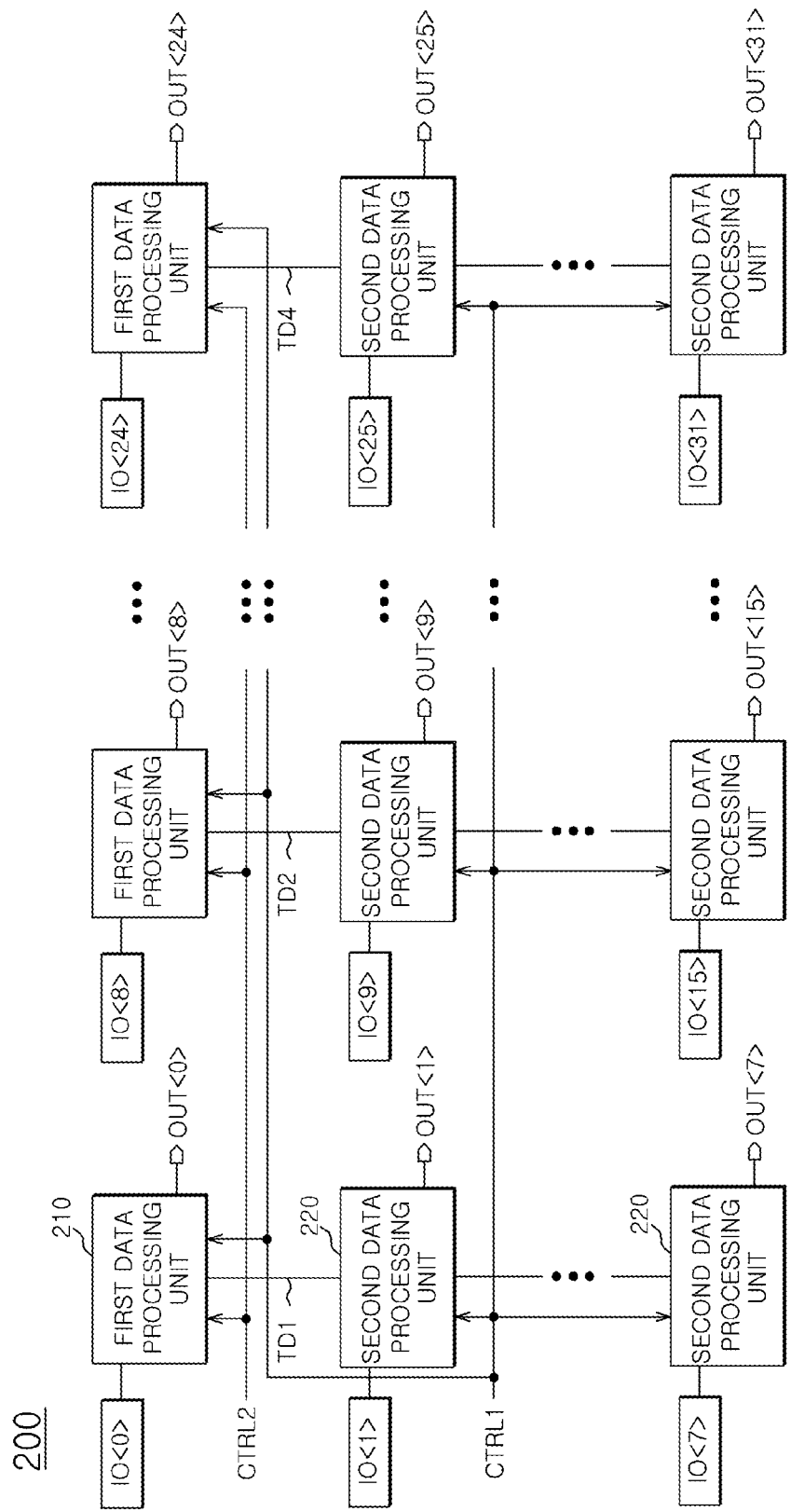
FIG. 2 is a block diagram illustrating a representation of the internal configuration of a data control block 200 of FIG. 1.

Referring to FIG. 2, the data control block 200 may include a plurality of first data processing units 210 and a plurality of second data processing units 220.

A part of the plurality of input/output pads IO<0> to IO<31>, to which the test data is input, may be set in advance, and in an embodiment, the test data may be input to four of the 32 pads.

Accordingly, the part of the plurality of input/output pads IO<0> to IO<31>, to which the test data is input, may be for example IO<0>, IO<8>, IO<16>, and IO<24>.

The plurality of first data processing units 210 may be connected to the input/output pads IO<0>, IO<8>, IO<16>, and IO<24>, respectively.

The plurality of first data processing units 210 may generate first output signals OUT<0>, OUT<8>, OUT<16>, and OUT<24> by using the test data input through the input/output pads IO<0>, IO<8>, IO<16>, and IO<24>.

The plurality of first data processing units 210 may generate the first output signals OUT<0>, OUT<8>, OUT<16>, and OUT<24>, and simultaneously transmit or substantially simultaneously transmit second output signals TD1 to TD4 to the plurality of second data processing units 220.

The second output signals TD1 to TD4 may have the same value or values different from one another according to the test data input through the input/output pads IO<0>, IO<8>, IO<16>, and IO<24>.

The plurality of second data processing units 220 may be connected to the other input/output pads, except for the input/output pads IO<0>, IO<8>, IO<16>, and IO<24>, respectively.

Each of the plurality of first data processing units 210 may be configured to transfer test data, which is input through an input/output pad connected thereto, to a predetermined number of (for example, 7) second data processing units 220.

Figure 3:
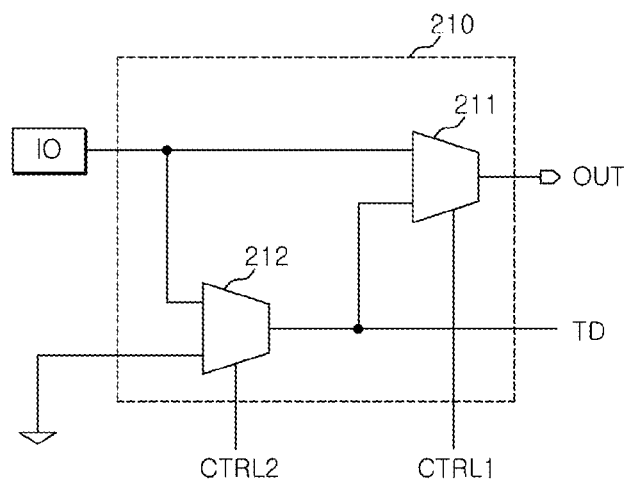
FIG. 3 is a circuit diagram of a representation of a first data processing unit 210 of FIG. 2.

Referring to FIG. 3, each first data processing unit 210 may include a first multiplexer 211 and a second multiplexer 212.

The first multiplexer 211 may be configured to output a signal input through a first input terminal, that is, data input through one input/output pad (for example, IO<0>) of the plurality of input/output pads IO<0> to IO<31>, or select and output a signal input through a second input terminal, in response to the control signal CTRL1.

The second multiplexer 212 may be configured to generate a signal input through a first input terminal, that is, data input through an input/output pad IO, as an output signal TD, or to generate a signal input through a second input terminal as the output signal TD, in response to the control signal CTRL2.

The second input terminal of the second multiplexer 212 may be connected to a ground terminal.

Logic values of control signals CTRL<1:2> provided in a test mode and logic values of control signals CTRL<1:2> provided in a normal mode may be different from each other.

In the test mode, the first multiplexer 211 may select test data input to an input/output pad and generate an output signal OUT (for example, OUT<0>) according to the control signals CTRL<1:2> (see FIG. 2).

In the test mode, the second multiplexer 212 may select test data input to an input/output pad and generate an output signal TD, for example, TD1, according to the control signal CTRL1 (see FIG. 2).

In the normal mode, the first multiplexer 211 may select normal data input to the input/output pad and generate an output signal OUT according to the control signals CTRL<1:2>.

In the normal mode, the second multiplexer 212 may fix an output signal TD to a ground level according to the control signal CTRL1.

The values of the control signals CTRL<1:2> may be adjusted according to necessity, so that the output signal OUT of the first multiplexer 211 and the output signal TD of the second multiplexer 212 may be fixed to the ground level.

Figure 4:
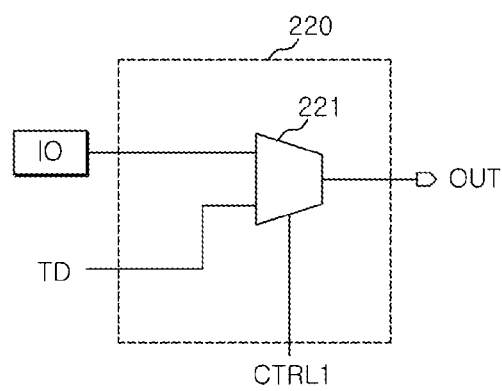
FIG. 4 is a circuit diagram of a representation of a second data processing unit 220 of FIG. 2.

Referring to FIG. 4, each second data processing unit 220 may include a multiplexer 221.

The multiplexer 221 may be configured to output a signal input through a first input terminal, that is, data input through one input/output pad (for example, IO<1>) of the plurality of input/output pads IO<0> to IO<31>, or select and output a signal input through a second input terminal, that is, the output signal TD of the first data processing unit 210, in response to the control signal CTRL1.

In the test mode, the multiplexer 221 may select the output signal TD of the first data processing unit 210 and generate an output signal OUT according to the control signal CTRL1.

In the normal mode, the multiplexer 221 may select normal data input to an input/output pad and generate an output signal OUT according to the control signal CTRL1.

The test operation of the aforementioned embodiments relating to FIGS. 1-4 will be described below.

A device exterior to the semiconductor apparatus, for example, test equipment may be used as a device exterior to the semiconductor apparatus. The test equipment may input serial test data through the input/output pads IO<0>, IO<8>, IO<16>, and IO<24> of the plurality of input/output pads IO<0> to IO<31>.

The plurality of first data processing units 210 may generate the first output signals OUT<0>, OUT<8>, OUT<16>, and OUT<24> based on the serial test data input through the input/output pads IO<0>, IO<8>, IO<16>, and IO<24>.

Simultaneously or substantially simultaneously, the plurality of first data processing units 210 may transmit the second output signals TD1 to TD4 based on the serial test data input through the input/output pads IO<0>, IO<8>, IO<16>, and IO<24> to the plurality of second data processing units 220, respectively.

The plurality of second data processing units 220 may generate third output signals OUT<1:7>, OUT<9:15>, OUT<17:23>, and OUT<25:31> in response to the respective second output signals TD1 to TD4.

The plurality of first data processing units 210 and the plurality of second data processing units 220 may transmit their own output signals OUT<0:31> to the parallelizing units 501 corresponding to the input/output pads IO<0> to IO<31>.

The parallelizing units 501 may parallelize the respective output signals OUT<0:31> and may transmit parallelized data to the peripheral circuit/core block 700.

The peripheral circuit/core block 700 may write the parallelized data transmitted from the parallelizing units 501 in the memory block, and then may output the data written in the memory block to an exterior of the semiconductor apparatus through the plurality of input/output pads IO<0> to IO<31> according to an external control, that is for example, control from test equipment.

Then, the test equipment may monitor data output from the semiconductor apparatus, thereby performing a test.

Figure 5:
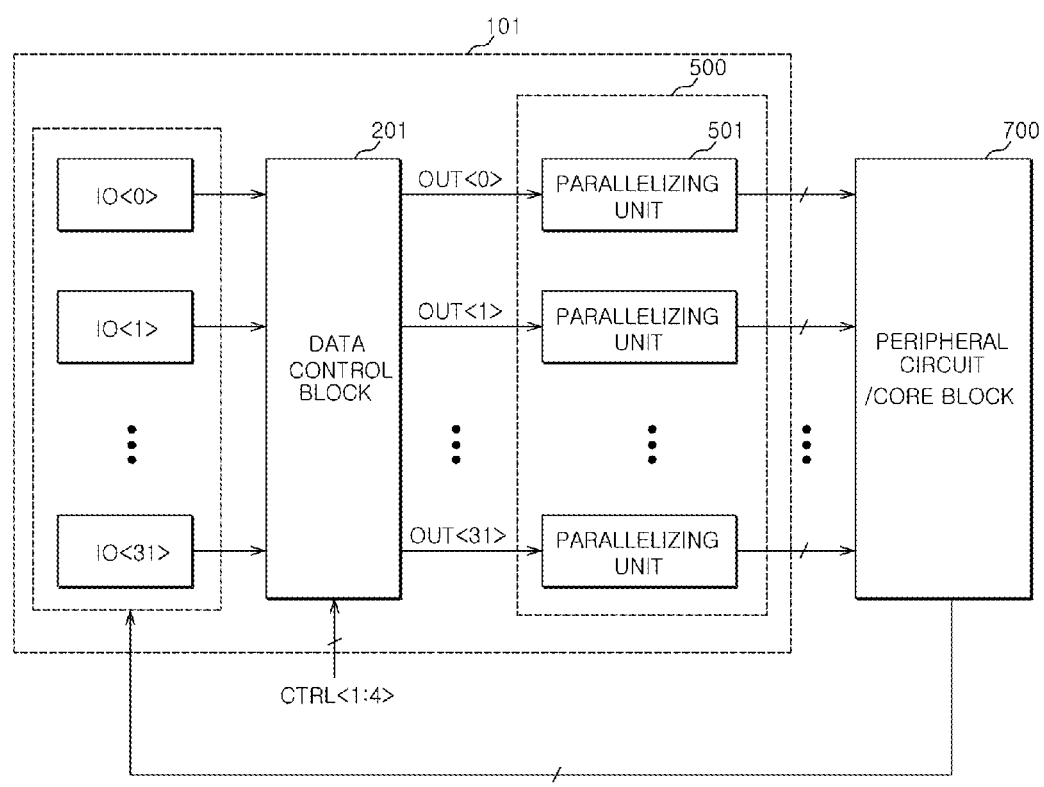
FIG. 5 is a block diagram of a representation of a data input circuit 101 of a semiconductor apparatus according to an embodiment.

Referring to FIG. 5, a data input circuit 101 of a semiconductor apparatus according to an embodiment may include a plurality of input/output pads IO<0> to IO<31>, a data control block 201, and a parallelizing block 500.

In another embodiment, the number of the plurality of input/output pads IO<0> to IO<31> may be 32. However the embodiments are not limited in this way as the number of input/output pads may be more or less than 32. For example, the number of input/output pads may increase with the technology development and the design scheme of future semiconductor apparatuses.

The parallelizing block 500 may include a plurality of parallelizing units 501. The parallelizing block 500 may correspond to the plurality of input/output pads IO<0> to IO<31> in a one-to-one manner. Each parallelizing unit 501 of parallelizing block 500 may correspond to the plurality of serial test data OUT<0> to OUT<31> in a one-to-one manner for receiving the serial test data OUT<0> to OUT<31> of the data control block 201.

Each of the plurality of parallelizing units 501 may be configured to align input serial data to parallel data, and output the parallel data.

Output from the parallelizing block 500 may be provided to a peripheral circuit/core block 700.

The peripheral circuit/core block 700 may include a memory block and circuit configurations relating to reading and writing data.

The peripheral circuit/core block 700 may be configured to write the output of the parallelizing block 500 in the memory block in response to a write command. The peripheral circuit/core block 700 may be configured to output data written in the memory block to an exterior of the semiconductor apparatus through the plurality of input/output pads IO<0> to IO<31> in response to a read command.

The data control block 201 may be configured to transmit serial test data (i.e., OUT<0> to OUT<31>). The serial test data may be input through one of the plurality of input/output pads IO<0> to IO<31>, to the parallelizing units 501 corresponding to all the plurality of input/output pads IO<0> to IO<31> in response to control signals CTRL<1:4>.

The data control block 201 may be configured to convert a pattern of the serial test data, which may be input through the one of the plurality of input/output pads IO<0> to IO<31>, in response to a part (for example, CTRL4) of the control signals CTRL<1:4>.

The data control block 201 may be configured to transmit serial normal data, which is input through the plurality of input/output pads IO<0> to IO<31>, to the parallelizing units 501 corresponding to the plurality of input/output pads IO<0> to IO<31> in response to the control signals CTRL<1:4>.

The control signals CTRL<1:4> may be provided from a device exterior to the semiconductor apparatus, or may be stored through a fuse set and the like so as to output a value set in a test mode according to a MRS (Mode Register Set).

When various patterns of test data is input through all the plurality of input/output pads IO<0> to IO<31> and thus a read operation is performed, it may be possible to improve the accuracy of a test operation.

In an embodiment, even though test data is input using only one of the plurality of input/output pads IO<0> to IO<31>, the same pattern of test data or different patterns of test data is input through all the plurality of input/output pads IO<0> to IO<31>. In this way, it may be possible to simultaneously improve both the accuracy of the test operation and the testing efficiency.

Figure 6:
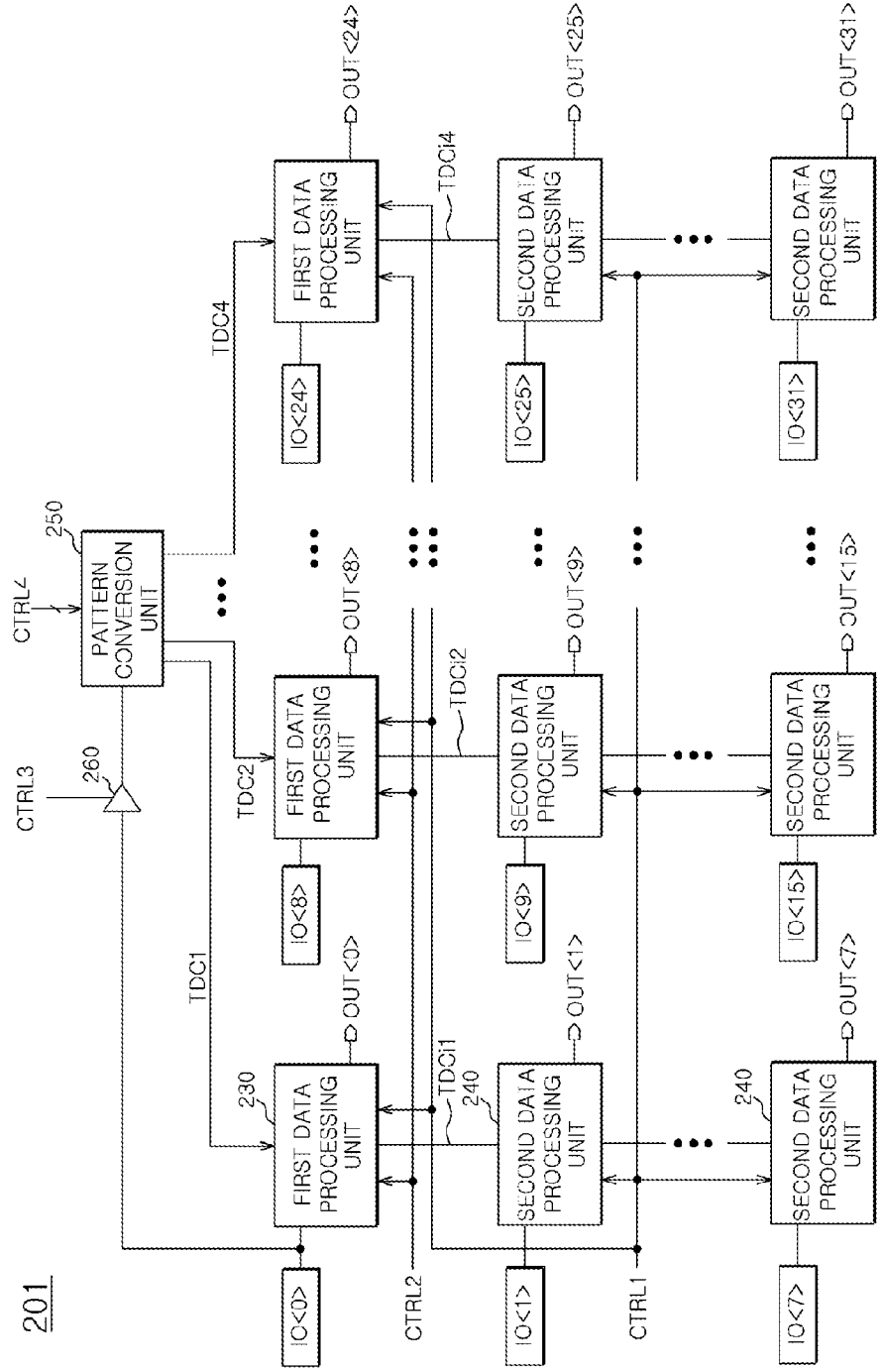
FIG. 6 is a block diagram illustrating a representation of the internal configuration of a data control block 201 of FIG. 5.

Referring to FIG. 6, the data control block 201 may include a plurality of first data processing units 230, a plurality of second data processing units 240, a pattern conversion unit 250, and a switch 260.

One of the plurality of input/output pads IO<0> to IO<31>, to which the test data is input, may be set in advance, and in an embodiment, the test data may be input to IO<0> of the 32 pads.

The switch 260 may be configured to allow the test data, which is input through the input/output pad IO<0> to pass through, or to block the test data in response to the control signal CTRL3.

The pattern conversion unit 250 may be configured to differently convert the patterns of the test data having passed through the switch 260 in response to the control signal CTRL4, and to generate plural test data TDC1 to TDC4.

The pattern conversion unit 250 may be configured to distribute the test data having passed through the switch 260 in response to the control signal CTRL4, and to generate the plural test data TDC1 to TDC4.

The plurality of first data processing units 230 may be connected to input/output pads IO<0>, IO<8>, IO<16>, and IO<24>, respectively.

The plurality of first data processing units 230 may generate first output signals OUT<0>, OUT<8>, OUT<16>, and OUT<24> by using the plural test data TDC1 to TDC4 provided by the pattern conversion unit 250.

The plurality of first data processing units 230 may generate the first output signals OUT<0>, OUT<8>, OUT<16>, and OUT<24>, and may simultaneously or substantially simultaneously transmit second output signals TDCi1 to TDCi4 generated by internally processing the plural test data TDC1 to TDC4 to the plurality of second data processing units 240.

Each of the plurality of first data processing units 230 may be configured to transfer the second output signals TDCi1 to TDCi4 to a predetermined number of (for example, 7) second data processing units 240.

The plurality of second data processing units 240 may be connected to the other input/output pads, except for the input/output pads IO<0>, IO<8>, IO<16>, and IO<24>, respectively.

Figure 7:
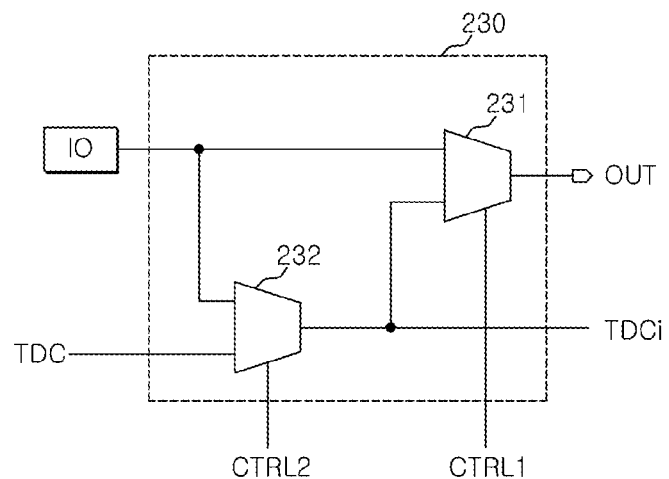
FIG. 7 is a circuit diagram of a representation of a first data processing unit 230 of FIG. 6.

Referring to FIG. 7, each first data processing unit 230 may include a first multiplexer 231 and a second multiplexer 232.

The first multiplexer 231 may be configured to output a signal input through a first input terminal, that is, data input through one input/output pad (for example, IO<0>) of the plurality of input/output pads IO<0> to IO<31>, or select and output a signal input through a second input terminal, that is, an output signal TDCi of the second multiplexer 232, in response to the control signal CTRL1.

The second multiplexer 232 may be configured to generate the output signal TDCi by selecting a signal input through a first input terminal (data input through an input/output pad IO) or test data TDC input through a second input terminal in response to the control signal CTRL2.

Logic values of control signals CTRL<1:2> provided in a test mode and logic values of control signals CTRL<1:2> provided in a normal mode may be different from each other.

In the test mode, the first multiplexer 231 may select test data input to an input/output pad and generate an output signal OUT (for example, OUT<0>) according to the control signals CTRL<1:2>.

In the test mode, the second multiplexer 232 may select the test data TDC input to an input/output pad and generate the output signal TDCi according to the control signal CTRL1.

In the normal mode, the first multiplexer 231 may select normal data input to the input/output pad and generate an output signal OUT according to the control signals CTRL<1:2>.

Figure 8:
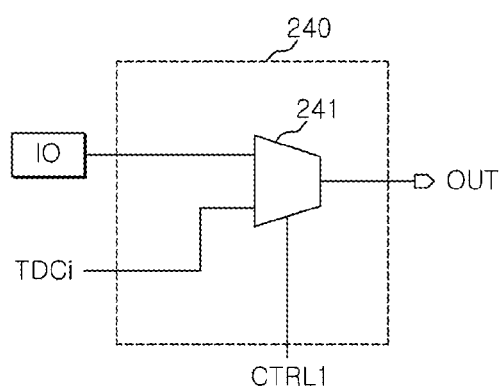
FIG. 8 is a circuit diagram of a representation of a second data processing unit 240 of FIG. 6.

Referring to FIG. 8, each second data processing unit 240 may include a multiplexer 241.

The multiplexer 241 may be configured to output a signal input through a first input terminal, that is, data input through one input/output pad (for example, IO<1>) of the plurality of input/output pads IO<0> to IO<31>, or select and output a signal input through a second input terminal, that is, the output signal TDCi of the first data processing unit 230, in response to the control signal CTRL1.

In the test mode, the multiplexer 241 may select the output signal TDCi of the first data processing unit 230 and generate an output signal OUT according to the control signal CTRL1.

In the normal mode, the multiplexer 241 may select normal data input to an input/output pad and generate an output signal OUT according to the control signal CTRL1.

The test operation of the aforementioned embodiments relating to FIGS. 5-8 will be described below.

A device exterior to the semiconductor apparatus, for example, test equipment may be used as a device exterior to the semiconductor apparatus. The test equipment may input serial test data through one (for example, IO<0>) of the plurality of input/output pads IO<0> to IO<31>.

The switch 260 may transmit the serial test data input through the input/output pad IO<0> to the pattern conversion unit 250 in response to the control signal CTRL3.

In these cases, it may be assumed that the control signal CTRL4 has a value of allowing the patterns of the serial test data input through the input/output pad IO<0> to be differently converted.

The pattern conversion unit 250 may transmit the plural test data TDC1 to TDC4 having patterns different from that of the serial test data input through the input/output pad IO<0> to the plurality of first data processing units 230 in response to the control signal CTRL4.

The plurality of first data processing units 230 may generate the first output signals OUT<0>, OUT<8>, OUT<16>, and OUT<24> based on the plural test data TDC1 to TDC4.

Simultaneously or substantially simultaneously, the plurality of first data processing units 230 may transmit the second output signals TDCi1 to TDCi4 based on the plural test data TDC1 to TDC4 to the plurality of second data processing units 240, respectively.

The plurality of second data processing units 240 may generate third output signals OUT<1:7>, OUT<9:15>, OUT<17:23>, and OUT<25:31> in response to the respective second output signals TDCi1 to TDCi4.

The plurality of first data processing units 230 and the plurality of second data processing units 240 may transmit their own output signals OUT<0:31> to the parallelizing units 501 corresponding to the input/output pads IO<0> to IO<31>.

The parallelizing units 501 may parallelize the respective output signals OUT<0:31> and may transmit parallelized data to the peripheral circuit/core block 700.

The peripheral circuit/core block 700 may write the parallelized data transmitted from the parallelizing units 501 in the memory block, and then may output the data written in the memory block to an exterior of the semiconductor apparatus through the plurality of input/output pads IO<0> to IO<31> according to external control, that is for example, control from test equipment.

Then, the test equipment may monitor data output from the semiconductor apparatus, thereby performing a test.

Figure 9:
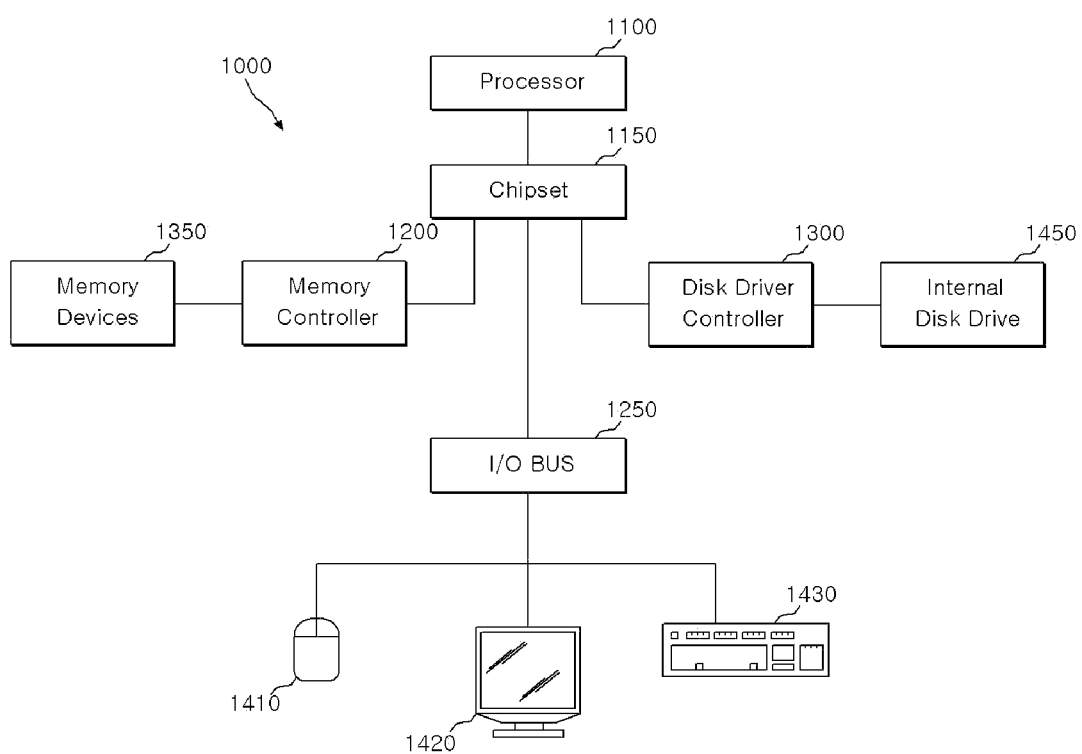
FIG. 9 illustrates a block diagram of an example of a representation of a system employing the data input circuit of a semiconductor device in accordance with the embodiments discussed above with relation to FIGS. 1-8.

The data input circuits of the semiconductor devices discussed above (see FIGS. 1-8) are particular useful in the design of memory devices, processors, and computer systems. For example, referring to FIG. 9, a block diagram of a system employing the data input circuit of a semiconductor device in accordance with the embodiments are illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be operably coupled to the chipset 1150. The memory controller 1200 may include at least one data input circuit of a semiconductor device as discussed above with reference to FIGS. 1-8. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one data input circuit of a semiconductor device as discussed above with relation to FIGS. 1-8, the memory devices 1350 may include a plurality of word lines and a plurality of bit lines for defining a plurality of memory cell. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 (i.e., internal disk drive) may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 9 is merely one example of a system employing the data input circuit of a semiconductor device as discussed above with relation to FIGS. 1-8. In alternate embodiments, such as cellular phones or digital cameras, the components may differ from the embodiments illustrated in FIG. 9.

While various embodiments have been described above, it will be understood to those skilled in the art that the embodiments described are by way of example only. Accordingly, the data input circuit of a semiconductor apparatus described herein should not be limited based on the described embodiments. Rather, the data input circuit of a semiconductor apparatus described herein should only be limited in light of the claims that follow when taken in conjunction with the above description and accompanying drawings.

What is claimed is:

1. A data input circuit of a semiconductor apparatus, comprising:
   a plurality of parallelizing units corresponding to a plurality of input/output pads in a one-to-one manner; and
   a data control block comprising a plurality of first data processing units and a plurality of second data processing units,
   wherein, during a test mode, the plurality of first data processing units are configured to transmit a serial test data, which is input through less than all of the plurality of input/output pads, to less than all of the plurality of parallelizing units and all of the plurality of second data processing units in response to a first control signal and a second control signal,
   wherein, during the test mode, the plurality of second data processing units are configured to transmit the serial test data to remaining parallelizing units in response to the first control signal,
   and wherein, during a normal mode, the plurality of first data processing units and the plurality of second data processing units are configured to transmit a normal data, which is input through all of the plurality of input/output pads each by each, to all of the plurality of parallelizing units each by each in response to the first control signal.

2. The data input circuit of a semiconductor apparatus according to claim 1, further comprising:
   a peripheral circuit/core block configured to receive parallel data from the plurality of parallelizing units and to store parallel data in response to a write command, and to output the data previously stored through the plurality of input/output pads in response to a read command.

3. The data input circuit of a semiconductor apparatus according to claim 1, wherein the data control block is configured to transmit the normal data to the plurality of parallelizing units each by each in response to the first and second control signals,
   wherein the normal data is input through all of the plurality of input/output pads.

4. The data input circuit of a semiconductor apparatus according to claim 1, wherein the data control block comprises:
   the plurality of first data processing units coupled to the less than all of the plurality of input/output pads; and
   the plurality of second data processing units coupled to the remaining input/output pads,
   wherein the input/output pads coupled with the second data processing units are different from the input/output pads coupled with the first data processing units.

5. The data input circuit of a semiconductor apparatus according to claim 4, wherein the plurality of first data processing units are configured to generate first output signals and second output signals by using the serial test data, and to transmit the first output signals to less than all of the plurality of parallelizing units corresponding to the less than all of the plurality of input/output pads.

6. The data input circuit of a semiconductor apparatus according to claim 4, wherein the plurality of second data processing units are configured to generate third output signals by using the second output signals, and to transmit the third output signals to the remaining parallelizing units, except for the less than all of the plurality of parallelizing units.

7. The data input circuit of a semiconductor apparatus according to claim 4, wherein each of the plurality of first data processing units comprises:
   a first multiplexer configured to output a signal input through an input/output pad connected to a first input terminal, or a signal input through a second input terminal as a first output signal in response to the first control signal; and
   a second multiplexer configured to output a signal input through the input/output pad connected to a first input terminal, or a signal input through a second input terminal as a second output signal in response to the second control signal.

8. The data input circuit of a semiconductor apparatus according to claim 7, wherein the second input terminal of the second multiplexer is coupled to a ground terminal.

9. The data input circuit of a semiconductor apparatus according to claim 7, wherein each of the plurality of second data processing units comprises:
   a multiplexer configured to output a signal input through an input/output pad connected to a first input terminal, or the second output signal input through a second input terminal as a third output signal in response to the first control signal.

10. A data input circuit of a semiconductor apparatus, comprising:
    a plurality of parallelizing units corresponding to a plurality of input/output pads in a one-to-one manner;
    a pattern conversion unit configured to convert a pattern of a serial test data, which is input through one of the plurality of input/output pads, and to generate plural test data having patterns different from each other; and a data control block comprising a plurality of first data processing units and a plurality of second data processing units, wherein, during a test mode, the plurality of first data processing units are configured to transmit the plural test data to less than all of the plurality of parallelizing units and all of the plurality of second data processing units in response to a first control signal and a second control signal, wherein, during the test mode, the plurality of second data processing units are configured to transmit the plural test data to remaining parallelizing units in response to the first control signal, and wherein, during a normal mode, the plurality of second data processing units are configured to transmit a normal data, which is input through remaining input/output pads, to the remaining parallelizing units in response to the first control signal.

11. The data input circuit of a semiconductor apparatus according to claim 10, further comprising:
a peripheral circuit/core block configured to receive parallel data from the plurality of parallelizing units and to store parallel data in response to a write command, and to output the data previously stored through the plurality of input/output pads in response to a read command.

12. The data input circuit of a semiconductor apparatus according to claim 10, wherein the data control block is configured to transmit the normal data to the plurality of parallelizing units each by each in response to the first and second control signals,
wherein the normal data is input through all of the plurality of input/output pads.

13. The data input circuit of a semiconductor apparatus according to claim 10, wherein the data control block comprises:
the plurality of first data processing units configured to be coupled to less than all of the plurality of input/output pads and to generate first output signals and second output signals by using the plural test data; and
the plurality of second data processing units configured to be coupled to remaining input/output pads, and to generate third output signals by using the second output signals,
wherein the serial test data is input through the one of the plurality of input/output pads, and
wherein the input/output pads coupled with the second data processing units are different from the input/output pads coupled with the first data processing units.

14. The data input circuit of a semiconductor apparatus according to claim 13, further comprising:
a switch coupled between the pattern conversion unit and the input/output unit of where the serial test data is received,
wherein the switch transmits the serial test data received through the input/output unit of where the serial test data is received to the pattern conversion unit in response to a third control signal.

15. The data input circuit of a semiconductor apparatus according to claim 13, wherein the plurality of first data processing units are configured to transmit the first output signals to less than all of the plurality of parallelizing units corresponding to the part of the plurality of input/output pads.

16. The data input circuit of a semiconductor apparatus according to claim 13, wherein the plurality of second data processing units are configured to transmit the third output signals to the remaining parallelizing units, except for the less than all of the plurality of parallelizing units.

17. The data input circuit of a semiconductor apparatus according to claim 13, wherein each of the plurality of first data processing units comprises:
a first multiplexer configured to output a signal input through an input/output pad connected to a first input terminal, or a signal input through a second input terminal as a first output signal in response to the first control signal; and
a second multiplexer configured to output a signal input through the input/output pad connected to a first input terminal, or one of the plural test data input through a second input terminal as a second output signal in response to the second control signal.

18. The data input circuit of a semiconductor apparatus according to claim 17, wherein each of the plurality of second data processing units comprises:
a multiplexer configured to output a signal input through an input/output pad connected to a first input terminal, or the second output signal input through a second input terminal as a third output signal in response to the first control signal.

* * * * *